Patented Feb. 15, 1949

2,461,910

UNITED STATES PATENT OFFICE 2,461,910

PROCESS FOR THE DEGRADATION OF THE SIDE-CHAIN OF STEROIDS AND STEROIDS SUITABLE THEREFOR

Karl Miescher, Riehen, Hugo Frey, Olten, and Charles Meystre and Albert Wettstein, Basel, Switzerland, assignors to Ciba Pharmaceutical Products, Inc., Summit, N. J.

No Drawing. Application March 28, 1946, Serial No. 657,896. In Switzerland August 18, 1942

7 Claims. (Cl. 260—397.5)

This application is a continuation-in-part of our application Serial No. 497,556, filed August 5, 1943.

In said application and in continuation-in-part Serial No. 581,963, filed March 9, 1945 (now abandoned), we disclosed processes for the degradation of the side-chain of steroids which makes possible the removal of at least three of the carbon atoms originally contained in the side-chain. These already disclosed new processes comprise causing ring - saturated or ring - unsaturated steroids which contain in 17-position a substituent

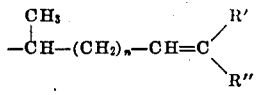

wherein R' and R'' represent hydrogen, an aliphatic, aromatic or hydroaromatic radical, and $n$ means the number 1 or 2, if necessary with temporary protection of nuclear double bonds and sensitive substituents, to react with carboxylic acid imides, amides or arylamides which are substituted by halogen at the nitrogen atom, subsequently treating the products obtained with agents capable of eliminating hydrogen halide, (any ammonium compounds, acyloxy derivatives or ethers intermediately produced being subjected to heat) and finally splitting up the newly formed conjugated double bond by means of oxidizing agents, if necessary with temporary protection of nuclear double bonds and sensitive substituents. In one form of the process a hydroxyl group is converted into a keto-group before the oxidative splitting of the conjugated system.

The starting materials for our already disclosed new processes can be prepared, for example, from functional derivatives such as esters, halides or anhydrides of steroid carboxylic acids, which contain in the 17-position the radical

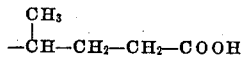

or from steroid ketones which contain the side-chain

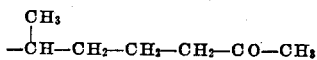

by known methods. Examples of such acids are, in particular, cholic acid, desoxycholic acid, chenodesoxycholic acid, hyodesoxycholic acid, lithocholic acid, cholanic acid, allocholanic acid, ursocholanic acid, $\Delta^5$-3-hydroxy-cholenic acid, $\Delta^7$-3,12-dihydroxy-cholenic acid and apocholic acid; examples of ketones are norcholestane-3-ol-25-one and $\Delta^5$-nor-cholestene-3-ol-25-one. In addition to the acids and ketones mentioned, there may be used starting materials derived from corresponding derivatives, substitution or conversion products containing any substituents, particularly keto-groups; also those derived from the next higher homologues of the acids and the next lower homologues of the ketones mentioned. Such carboxylic acid derivatives or ketones can be caused to react with organic compounds of magnesium or other metals, e. g. methyl, ethyl or phenyl magnesium halides, and water can be eliminated directly or indirectly from the tertiary carbinols obtained. In addition to the ethylene compounds produced in the manner described, compounds of the type of dehydro-nor-cholene (see, Wieland and co-workers, Zeitschrift für physiologische Chemie, 150, page 273 [1925]; ibidem, 186, page 229 [1930]) are suitable for use as starting materials. In these compounds the group

is represented by the carbon atom 12 and the r e s i d u a l cyclopentanopolyhydrophenanthrene structure.

A number of methods for the degradation of the side chain of steroids are already known. For instance, the gradual degradation of bile acids by Wieland's or Curtius' method is widely used, which methods have to be repeated several times, as only one carbon atom is removed at a time. These processes are therefore very tedious and expensive and, in addition, only give very moderate yields. The radical oxidation of sterols with chromic acid is simpler. But in this case too, only a little part of the parent product is converted into compounds with a largely or completely degraded side-chain. To a considerable extent the side-chain is only insufficiently degraded e. g. down to the stage of nor-cholestane-25-one or of cholanic acid, or the nucleus is split up under the vigorous conditions of the reaction. If the partly degraded products of the reaction are again strongly oxidized, the total yield decreases quite considerably, calculated on the amount of the twice oxidized parent substance. This is all the more pronounced as compounds of the cholanic acid series give worse results on vigourous oxidation, than the sterols. Finally many steroids, substituted in the nucleus in a special way, only occur in nature in the form of the cholanic acids and not as the corresponding sterols. For these reasons, a process which allows compounds of the cholanic acid or the norcholestane-25-one series to be degraded to a considerable degree with a good yield and in a clear and easy manner, represents a considerable advance.

In the first stage of our already disclosed new processes, derivatives of imides of dicarboxylic acids which are substituted by halogen (e. g. bromine or chlorine) at the nitrogen atom, are caused to act on the parent materials; as examples of such derivatives may be given N-halogen succinimides, phthalimides, parabanic acids, cyanuric acids, hydantoins or barbituric acids. In their stead corresponding derivatives of primary or secondary carboxylic acid amides, such as acetamide, propionamide or diacetamide, or of carboxylic acid arylamides, e. g. acetanilides and benzanilides halogenated or nitrated in the nucleus, may also be used. To carry out halogenation of the methylene group, which is present in the substituent mentioned in the α-position to the double bond, it was indicated that it is best to work in an inert solvent or diluent such as carbon tetrachloride, chloroform, benzene, cyclohexane, methyl-cyclohexane, ethyl ether or dioxane. To prevent side-reactions as well as possible, it was indicated that it is often advantageous to work in the dark.

Double bonds which may be present in the cyclopentanopolyhydrophenanthrene nucleus can be temporarily protected during halogenation in the usual way by saturation with halogen or hydrogen halide. The latter has the special advantage that the double bonds are regenerated in the next stage by means of basic reagents. Finally, substituents which are sensitive to halogenating agents may be advantageously protected temporarily, particularly free hydroxyl groups, for example by esterification or etherification. The esters with aromatic acids such as benzoic acid are, in contrast to the free hydroxyl compounds, very stable to the above halogenating agents; the esters with aliphatic acids are also generally attacked more slowly than the active methylene groups. Free keto groups also react considerably more slowly and hardly need to be protected. If necessary they can be converted into acetals, in particular of glycols. Free carboxyl groups do not react in general and therefore generally do not need special protection.

The halogenated products are subjected, either in the crude form or after purification, to a treatment eliminating hydrogen halide, e. g. they are treated with agents capable of eliminating hydrogen halide, for instance with basic agents, such as amines like collidine, quinoline, dimethylaniline, pyridine or cyclohexylamine, with alkaline or alkaline earth hydroxides or carbonates; instead of them also carboxylic acid salts such as the alkali or silver salts of fatty acids or even alcohols or phenols may be used. According to the reagents used and the conditions of the reaction, the reactive halogen is directly eliminated in the form of hydrogen halide and/or there are formed ammonium halides by the action of tertiary amines (e. g. pyridinium halides which, owing to their insolubility in ether, are easy to separate), acyloxy derivatives by the action of carboxylic acid salts, or ethers by the action of alcohols or phenols. Ammonium halides, ammonium bases obtained from them, acyloxy derivatives and ethers are subsequently advantageously decomposed by heat, preferably in a vacuum or in an inert gas, so that an elimination of hydrogen halide is produced in stages. Instead of the agents capable of eliminating hydrogenhalide, there can be used appropriate measures, such as heating, evacuating, or the said agents and measures can also be combined. Reaction products with conjugated double bonds containing acyloxy groups which have been obtained can subsequently be completely or partially saponified.

The conjugated double bond newly formed in the reaction products is then split up by direct or indirect oxidation in known manner. We mention, for example, oxidation by means of a compound of hexavalent chromium (such as chromic acid), permanganate, ozonization and splitting of the ozonides, the action of peroxides such as perbenzoic acid, monoperphthalic acid or hydrogen peroxide (preferably in the presence of osmium tetra-oxide), and splitting (by means of, for example, chromic acid, lead tetra-acylates or periodic acid) of the glycols formed by hydrolysis of the oxide-ring or by direct addition of two hydroxyl groups to each of the double bonds.

During the oxidation, the double bonds contained in the cyclopentanopolyhydrophenanthrene nucleus may also be temporarily protected, for example, by addition and subsequent elimination of halogen or hydrogen halide, provided such protection is not made unnecessary by the special properties of the unsaturated system, such, as, for example, a double bond with a keto group in the α-position. In addition, other sensitive substituents such as hydroxyl groups may be protected in known manner, e. g. by esterification or etherification and after oxidation again liberated, if desired, partly or completely by hydrolysis. If, however, conversion of the nuclear hydroxyl groups to keto groups is desired, it can be carried out in known way, before, during or after oxidative cleavage of the conjugated double bond by the action of, in particular, oxidizing or dehydrogenating agents. Also chromic acid, permanganates, etc., are suitable oxidizing agents for this purpose; as dehydrogenating agents may be used, in particular, metal alcoholates or phenolates and carbonyl compounds (method of exchanging oxidation stages), or for example powdered metal by heating in a vacuum.

The products obtained by the new simple process, ketones, carboxylic acids, or aldehydes can be separated as usual and purified, for example, by recrystallization, chromatography, sublimation, reaction with keto reagents (particularly with those which give water-soluble condensation products), or by extraction with solutions of strong acids or their salts, or with basic reagents. They are themselves used for therapeutic purposes or may serve as intermediate products in the manufacture of medicaments.

In the halogenation step of the above described new processes it is sometimes necessary to use a large excess of one of the reaction components in order to obtain a moderately satisfactory result. The halogenated intermediate products split off hydrogen halide very easily, which latter reacts with the excess of halogenating agent to liberate halogen which in turn gives rise to side reactions.

The present application is based on the unexpected observation that, contrary to earlier statements, the introduction of halogen in α-position to the double bond by the action of a carboxylic acide imide, amide or aryl-amide halogenated at the nitrogen is considerably facilitated by exposure to light. This improvement in the process leads to a series of advantages. The speed of reaction must be mentioned primarily. By virtue thereof side reactions are practically precluded, and this makes it possible for the first time to isolate the primarily formed halogenated products. A further advantage is that reactants can be used in approximately stoichiometric quantities. Finally, the favourable influence of the illumination on the yield must be especially emphasized.

In other respects the present process is carried out in the manner described in our aforesaid application Serial No. 497,556 and continuation-in-part Serial No. 581,963 with regard to the reaction components to be used as starting materials, the solvents, etc. It is only necessary to emphazise the ease with which hydrogen halide can be eliminated from the halogenation products, whose isolation in pure form now becomes possible by virtue of the new process. The elimination of hydrogen halide can be brought about by simple heating, so that after the treatment with the halogenating agent it is only necessary to continue the boiling in order to obtain the diene. The improved new process is of special advantage for the production of progesterone by starting from $\Delta^{5:23}$-3-hydroxy-24:24-diphenyl-choladiene by way of the corresponding triene. Either the hydroxy group in the triene is de-hydrogenated to the keto-group and then the conjugated system is subjected to oxidative splitting, or the acylated or free triene is first oxidized to the methyl ketone stage and the resulting compound is converted in known manner into progesterone. The nuclear double bond may be protected, especially in the first step of the process, for example, by the addition of hydrogen halide or halogen. The $\Delta^{5:23}$-3-hydroxy-24:24-diphenyl-choladiene serving as starting material can be easily obtained from $\Delta^{5}$-3-hydroxy-cholenic acid. The latter acid is formed as a hitherto valueless by-product in the side chain degradation of cholesterol to dehydro-androsterone. By the new process the yield of progesterone, as compared with that obtained by the process of the aforesaid specifications, is increased many times.

For the exposure to light there may be used various sources of illumination which may or may not contain ultra-violet constituents, for example, the light from incandescent lamps, quartz lamps or arc lamps, or strong natural light such as the direct rays of the sun.

The following examples illustrate the whole invention but are not to be regarded as limiting it in any way, the parts mentioned being by weight:

*Example 1*

10 parts of $\Delta^{23}$-3$\alpha$:12-diacetoxy-24:24-diphenyl-cholene are boiled under reflux for 15 minutes on a water-bath with 6 parts of N-bromo-succinimide in 50 parts of carbon tetrachloride. The cooled solution is filtered off from the mixture of the unchanged bromosuccinimide and succinimide, and washed with cold carbon tetrachloride. Twenty parts of pyridine are added to the filtrate, the whole heated for one hour on a water bath and then evaporated down in vacuo. The product of the reaction is washed several times with ether, whereby the unchanged parent material and decomposed pyridinium salt go into solution. The insoluble residue consists of the pyridinium salt. This product can be recrystallized from aqueous methanol, from methanol alone or from a mixture of methanol and ether. It is hygroscopic and melts (with decomposition) at 220–227° C.

3 parts of the pyridinium salt are sublimed in a vacuum of 0.02 mm. in a molecular distillation flask. At a bath temperature of about 200–230° C., the products of the reaction, the diene and pyridine hydrobromide pass over. They are dissolved in ether and water. The ethereal solution gives, on evaporating down, a bright yellow product which is converted by concentration of a methanol solution in vacuo, into flocks which can be filtered off cold by suction.

After recrystallizing twice, bright yellow granules are obtained which melt indefinitely above 98° C. Analysis agrees with the expected diene of the formula $C_{40}H_{50}O_4$. From the ethereal solution separated off after treatment with pyridine, the same diene can be obtained by, for example, chromatography of the residue, with removal of the unchanged starting material. When the bromination with N-bromo-succinimide is carried out in the dark, boiling is continued advantageously for ½ hour or even longer.

Instead of with pyridine, the bromide may be reacted with a carboxylic acid salt or with an alcohol or phenol and the acyloxy compound or ether obtained then may be subjected to an analogous thermal decomposition.

Before oxidation, the product should be re-acetylated. For this purpose 2 parts are dissolved in 10 parts of pyridine and allowed to stand with 6 parts of acetic anhydride for 15 hours at 20° C. The solution is then concentrated down in vacuo, the residue dissolved in ether, and the solution washed in succession with 2 N hydrochloric acid, water, 2 N sodium carbonate solution and water, dried with sodium sulfate and evaporated down.

10 parts of the residue obtained in this way are dissolved in chloroform and treated at 0° C. with ozone, until a drop gives no further reaction with tetranitro methane but a positive reaction on potassium iodide starch paper. The solution is then shaken with 5 parts of zinc and 5 parts of glacial acetic acid at 0° C. It is then concentrated down in vacuo, the residue dissolved in ether, the ethereal solution washed with 2 N sodium carbonate solution, water, 2 N hydrochloric acid and water, then dried and evaporated down. The residue consists of 9.5 parts of a mixture from which, with help of the chloride of trimethyl-ammonium-acetic acid hydrazide, 4 parts of a ketone fraction can be separated off in known way. The latter is partly saponified cold by allowing to stand for 15 hours with a solution of potash in aqueous methanol, in order to ensure better isolation of the end-product. After neutralizing the solution with acetic acid it is freed from methanol in vacuo, the residue extracted with ether and the ethereal solution washed with 2 N sodium carbonate solution, water, 2 N hydrochloric acid and water, dried with sodium sulfate and evaporated down. On adding a crystal of the substance to the solution, the 3$\alpha$-hydroxy-12-acetoxy-pregnane-20-one, M. Pt. 207–209° C., crystallizes out immediately. A further quantity of the same product is obtained by chromatography of the mother liquors.

*Example 2*

10 parts of $\Delta^{23}$-3$\alpha$:12-diacetoxy-24:24-diphenyl-cholene are heated for 30 minutes in the dark on a water bath with 6 parts of N-bromo-succinimide in 50 parts of carbon tetrachloride. The residue is filtered off by suction and the filtrate evaporated down in vacuo. 60 parts of collidine or dimethylaniline are added to the residue and the solution boiled under reflux for one hour in an oil-bath. After evaporating down in vacuo, the residue is dissolved in ether and the ethereal solution washed with 2 N hydrochloric acid, water, 2 N sodium carbonate solution and water, dried, filtered through a layer of aluminium oxide, and evaporated down. The bright yellow residue is dissolved in 100 parts of hot methanol and the solution allowed to stand for 10 hours at 20° C. whereby four parts of the unchanged parent material crystalize out. The latter is filtered off by suction and washed with cold methanol. Part of the solvent is then evaporated off from the methanol solution in vacuo, whereby flocculent crystals of the diene gradually separate out. The latter are filtered off cold by suction and washed with ice-cold methanol. The bright yellow product obtained after recrystallizing twice melts indefinitely above 98° C. and is identical with the compound obtained by heating the pyridinium bromide as described in Example 1. For the next stage however the crude diene, obtained from the total methanol solution by completely evaporating it, is advantageously used. In addition the diene is acetylated and ozonized, as stated in Example 1, and the diacetate obtained partially saponified.

In a similar way the starting material can be chlorinated with, for example, N-chlor-2:4:6-trichlor-acetanilide or benzanilide instead of being brominated with N-bromo-succinimide, and the diene described above then be obtained from the chloride by means of collidine.

Instead of the 24:24-diphenyl compound, the corresponding 24:24-dimethyl-derivative (M. P. 88–89°) may also serve as starting material.

Instead of ozonizing the diene in the manner described, it can also be split up by oxidation with chromic acid. For this purpose ⅘ of its quantity of chromic acid, dissolved in 20 times the amount of glacial acetic acid, is added, and this solution allowed to stand for 15 hours at room temperature or for a correspondingly shorter time at a higher temperature. The excess chromic acid is then decomposed with methanol, the solution evaporated down in vacuo, the residue extracted with ether, the ether solution washed with 2 N sodium carbonate solution and then with water until neutral, and evaporated down. The ketone fraction is separated off from the neutral product obtained in a known manner, with the help of the chloride of pyridinium acetic acid hydrazide, and partially saponified cold, by allowing to stand for 15 hours with a solution of potash in aqueous methanol, in order to ensure better isolation of the end product. After neutralization of the solution with acetic acid, the methanol is removed in vacuo, the residue extracted with ether, the ether solution washed with 2 N sodium carbonate solution and water, dried and evaporated down. The residue is recrystallized from isopropylether and the 3α-hydroxy-12-acetoxy-pregnane-20-one described in Example 1 is thus obtained.

From the acid fraction removed with sodium carbonate solution after the oxidation with chromic acid there is obtained, after similar partial saponification the 3α-hydroxy-12-acetoxy-etio-cholanic acid.

*Example 3*

One part of $\Delta^{5:23}$-24:24-dimethyl-choladiene-3-ol-acetate of M. P. 124–126° (which can be prepared for example from $\Delta^5$-3-hydroxy-cholenic acid methylester by reaction with methyl-magnesium-halide, partial cold acetylation of the carbinol obtained with acetic anhydride and pyridine, splitting off the tertiary hydroxyl group e. g. by reacting with phosphorus pentoxide in benzene) is dissolved in 100 parts of absolute ether and a solution of 50 parts of hydrogen chloride in 100 parts of absolute alcohol added cold. After standing for 3 days, the precipitated needles are filtered off by suction and washed with some cold methanol. 10 parts of this hydrochloride are boiled for about 20 minutes with 7.5 parts of N-bromo-succinimide in 60 parts of carbon tetrachloride. The excess N-bromo-succinimide and the succinimide formed is filtered off by suction, washed with a little carbon tetrachloride and the filtrate evaporated down in vacuo. The residue is boiled for 1 hour under reflux with 120 parts of collidine. After evaporating the solution down in vacuo, the residue is dissolved in ether, the ether solution washed with normal sulfuric acid, water, normal sodium carbonate solution and water, dried and evaporated down. It is then dissolved in a little methanol and some unchanged starting material separated off by cooling the solution. An equal quantity of a 3 N solution of potassium hydroxide in methanol is added to the methanol solution and the mixture boiled for two hours under reflux. After working up the saponification mixture in the usual way, the product, which is a crude hydroxy-triene, is dissolved in benzene or toluene and dehydrogenated in known manner by means of aluminium alcoholate or aluminium phenolate and acetone or cyclohexanone. The crude keto-tiene isolated as usual is dissolved in glacial acetic acid, a solution of 4.5 molecular proportions of chromic acid in 95% acetic acid added and the whole allowed to stand at room temperature for 16 hours. The excess chromic acid is decomposed by the addition of methanol, the solution is concentrated down, water is added and the whole is extracted with ether. The ethereal solution is washed with normal sodium carbonate solution, water, normal sulfuric acid solution and water, dried and evaporated down in vacuo. From the residue there is obtained progesterone by chromatography, recrystallization, by reacting with ketonic reagents such as semicarbazide acetate or the chloride of trimethyl-ammonium-acetic acid hydrazide, or by extracting a benzine solution with 75 per cent. sulfuric acid in a known way. The progesterone crystallizes in dimorphous forms, which have melting points of 120° C. and 129° C.

Instead of dehydrogenating the hydroxyl group by the method of exchanging oxidation stages and oxidizing the double bond with chromic acid, both reactions can be carried out simultaneously with chromic acid (after temporary protection of the nuclear double bond) or one can first ozonize and then oxidize with chromic acid.

The same end-product can be obtained if as starting material the acetate is replaced by another ester, e. g. the benzoate, or if $\Delta^{4,23}$-24:24-dimethyl-choladiene-3-one (prepared from the 3-hydroxy compound by dehydrogenation with aluminium isopropylate and cyclohexanone) is brominated as described, hydrogen bromide split off from the bromide, the keto-triene obtained oxidized with chromic acid and worked up as described above.

In an entirely analogous way the $\Delta^4$-3-keto-bisnor-cholenic acid can be obtained starting from $\Delta^5$-3-benzoxy-24-isopropylidene-cholene (obtained, for example, by treating $\Delta^5$-3-hydroxynor-cholestene-25-one with a Grignard reagent, elimination of water and benzoylation) or from $\Delta^5$-3-benzoxy-24-ethylidene-cholene (obtained, for example, by reduction of the keto group in $\Delta^5$-3-hydroxy-nor-cholestene-25-one, elimination of water and benzoylation).

Example 4

4 parts of N-bromosuccinimide are added to a boiling solution of 10 parts of $\Delta^{23}$-3$\alpha$:12-diacetoxy-24:24-diphenylcholene in 50 parts of carbon tetrachloride and boiled for 10 minutes. The mixture is cooled, the excess of bromosuccinimide as well as the formed succinimide is suction-filtered and then washed with carbon tetrachloride. 10 parts of dimethylaniline are then added to the resulting clear yellow filtrate and the carbon tetrachloride is distilled off. The residual solution is heated for 10 minutes to boiling and cooled again. It is then diluted with ether and the dimethylaniline is removed by shaking out with dilute hydrochloric acid and water. On evaporating the dried solution there are obtained 10 parts of a residue which partly crystallizes.

In order to separate the unchanged starting material the residue is dissolved in 100 parts of acetone and the solution is diluted in the heat while stirring with water. The crystallized substance is suction-filtered after cooling, washed and dried, 7 parts of starting material being thus recovered which can be used for a fresh treatment. The resulting filtrate is concentrated and extracted with ether. The residue of the ethereal solution is re-acetylated on the water bath with acetic anhydride and pyridine. By further treating with aqueous acetone a further 0.6 part of starting material can be recovered.

The mother liquors are concentrated in a vacuum, extracted with ether, and on evaporating this ether solution there is obtained an amorphous yellow powder, the crude $\Delta^{20:23}$-3$\alpha$:12-diacetoxy-24:24-diphenyl-choladiene.

2.3 parts of this crude diene fraction are taken up in 40 parts of methanol and after addition of a solution of 0.5 part of potassium carbonate in 2 parts of water the whole is boiled for 3 hours in a reflux apparatus. Solution occurs within a few minutes and after 20-30 minutes the saponification product begins to slowly precipitate in a fine crystalline form. It is suction-filtered, washed with little ether and dried. This diene-12-monoacetate, after being recrystallized once from benzene, forms extremely fine needles of melting point 232-234° C.

2 parts of diene-monoacetate are heated with 10 parts of acetic anhydride and 20 parts of pyridine for 60 minutes on the boiling water-bath. After evaporating in a vacuum the residue is dissolved in chloroform and the extract is washed with dilute hydrochloric acid, then with sodium carbonate solution and subsequently with water. The chloroform solution is dried and evaporated, and the residue is recrystallized from a mixture of acetone and methanol. The pure $\Delta^{20,23}$-3$\alpha$:12 - diacetoxy - 24:24 - diphenyl - choladiene shows then the double melting point of 140-142° C. and 184° C. It is soluble even in boiling methanol only to about 1 per cent.

0.6 part of diene-diacetate is dissolved in 1 part of chloroform and 6 parts of glacial acetic acid and a solution of 0.4 part of chromium trioxide in 0.3 part of water and 1.7 parts of pure glacial acetic acid is allowed to slowly drop in. After further 2 hours the reaction mixture is poured into water. Some bisulfite is added and the whole is shaken out with ether. The solution washed until neutral yields after evaporation a reddish resin, from which the resulting alicyclic ketone is separated in known manner in the form of a yellow brown resin by means of the chloride of the pyridinium-acetic acid hydrazide.

For partial saponification this crude product is left to stand for about 20 hours in an aqueous methanolic solution of potash at 20° C. The whole is diluted with water and the methanol is largely expelled whereby the methylketone is precipitated in crystalline form. It is taken up in ether, the solution is washed with water until neutral, dried and concentrated. The precipitated crystals are recrystallized from methanol. The 3$\alpha$-hydroxy-12-acetoxy-pregnane-20-one thus obtained melts at 208-210° C.

Example 5

5.5 parts of the $\Delta^{20,23}$-3$\alpha$-hydroxy-12-acetoxy-24:24-diphenyl-choladiene of melting point 228-229° C., obtained as described in Example 4, are dissolved in 30 parts of chloroform and 100 parts of glacial acetic acid, and a solution of 5 parts of chromium trioxide in 4 parts of water is allowed to drop in within 1 hour at 15-20° C. After 3 hours the reaction mixture is poured into water and shaken out with ether after addition of some bisulfite. The solution washed until neutral yields after evaporation a reddish resin, from which the fraction of alicyclic ketones is separated as described in Example 4. It contains nearly pure 12-acetoxy-pregnane-3:20-dione which crystallizes after addition of some isopropylether and melts at 130-131° C. after recrystallization from acetone.

Example 6

10 parts of $\Delta^{23}$-3-acetoxy-5-chloro-24:24-diphenylcholene melting at 178-181° C. (obtained, for example, from $\Delta^5$-3-hydroxycholenic acid methyl ester by reaction with a phenyl magnesium halide followed by partial acetylation of the resulting carbinol with acetic anhydride in the cold, splitting off the tertiary hydroxyl group by boiling in glacial acetic acid and saturating the double bond in the 5-position with hydrogen chloride) and 3.1 parts of bromosuccinimide are heated at the boil in 150 parts of carbon tetrachloride while exposed to the light from a powerful incandescent lamp. In a few minutes the reaction is finished. The solution is then cooled with ice-water, and the resulting succinimide is separated by filtering with suction.

In order to eliminate hydrogen bromide and hydrogen chloride the clear filtrate is mixed with dimethylaniline, the carbon tetrachloride is removed by distillation, and the concentrated solution is heated at the boil for a short time. The product is then taken up in ether, the dimethylaniline is removed by agitation with hydrochloric acid and water, and the etheral solution is dried and evaporated.

For the purpose of hydrolysis the residue, which contains crude $\Delta^{5,20,23}$-3-acetoxy-24:24-diphenyl-cholatriene, is boiled in a reflux apparatus in 100 parts of ethanol with 3 parts of potassium hydroxide for 45 minutes, the solution is evaporated under reduced pressure, and the residue after dissolution in ether is washed with water. After drying and evaporating, crude $\Delta^{5,20,23}$-3-hydroxy-24:24-diphenyl-cholatriene is obtained.

To effect oxidation in the 3-position the crude triene is boiled with a solution of 90 parts of cyclohexanone in toluene, and into the slowly distilling solution is introduced dropwise a solution of 1.7 parts of aluminium isopropylate in toluene. The cooled solution is then mixed with an aqueous concentrated solution of Seignette's salt, and subjected to steam distillation. The cooled distillation residue is filtered with suction, washed with water and dried. The crude $\Delta^{4,20,23}$-3-keto-24:24-diphenyl-cholatriene so obtained is further worked up without purification.

It is taken up, for example, in a mixture of 450 parts of chloroform, 270 parts of glacial acetic acid and a little water, and slowly mixed, while stirring and cooling with ice, with a solution of about 8 parts of chromium trioxide in 20 parts of water and 270 parts of glacial acetic acid in such manner that the temperature does not rise above 3° C. The whole is stirred for a short time longer at 0° C., and unconsumed chromium trioxide is then decomposed with sodium bisulfite solution. After evaporation under reduced pressure, the whole is dissolved in water and extracted with a mixture of ether and chloroform. The ether-chloroform solutions are then washed with caustic soda solution and water, dried, and evaporated. The residue contains progesterone, and, in order to isolate the latter, the residue is dissolved, for example, in 100 parts of benzene and extracted several times with sulfuric acid of 50 per cent. strength. The sulfuric acid solutions are diluted with water, extracted with ether, and the ethereal solutions are washed neutral with caustic soda solution and water. After drying and evaporating, the crude progesterone remains behind. By recrystallization from ether or isopropyl ether there are obtained therefrom about 2.34 parts of pure progesterone having the double melting point 120° C. and 129° C. This represents a yield of 42.7 per cent. of the theoretical yield calculated on the $\Delta^{23}$-3-acetoxy-5-chloro-24:24-diphenyl-cholene which undergoes reaction.

If, on the other hand, the bromination with bromo-succinimide is conducted without the aid of light, only a small fraction of the substance enters into reaction even when a three-fold excess of bromosuccinimide is used, and the final yield, when the starting material recovered is taken into account, amounts at best to 12 per cent. but is generally considerably less.

Good yields are also obtained with other sources of light, for example, a luminous arc lamp or a mercury vapour lamp, or with the use of bromophthalimide instead of bromosuccinimide.

Example 7

The quantity of crude $\Delta^{5,20,23}$-3-hydroxy-24:24-diphenyl-cholatriene obtained from 10 parts of $\Delta^{23}$-3-acetoxy-5-chloro-24:24-diphenyl-cholene in the manner described in Example 6 is dissolved in warm hexane, and the solution is cooled, whereupon the crystalline triene slowly separates. From hexane there are obtained crystals melting at 136-140° C., and from rectified spirit needles melting at 162-166° C. A further quantity of the triene can be isolated, for example by chromatographing the mother liquors dissolved in hexane over aluminium oxide. A total of 5.7 parts of pure crystals are obtained, representing a yield of 66.4 per cent. of the theoretical yield.

2 parts of the triene are oxidized by means of 20 parts of cyclohexanone in toluene as described in Example 6. The resulting keto-compound is recrystallized from ethanol, and is thus obtained in a voluminous condition. It is dried under reduced pressure at 60-80° C. The pure $\Delta^{4,20,23}$-3-keto-24:24-diphenyl-cholatriene melts at 106-110° C. The yield of the pure ketone amounts to about 1.8 parts.

Example 8

10 parts of $\Delta^{23}$-3-acetoxy-5-chloro-24:24-diphenyl-cholene are converted into $\Delta^{5,20,23}$-3-acetoxy - 24:24 - diphenyl - cholatriene as described in Example 6. The crude product is suspended in hexane, filtered with suction, and then recrystallized from isopropanol. The pure compound melts at 175° C.

1 part of the acetate so obtained is oxidized in chloroform with 0.8 part of chromium trioxide as described in Example 1. The crude oil so obtained is boiled for 30 minutes in ethanol with 0.2 part of potassium hydroxide in a reflux apparatus. The alcohol is then evaporated under reduced pressure, the residue is taken up in ether, washed with water, dried, and the ethereal solution is evaporated. The residue contains crude $\Delta^5$-pregnene-3-ol-20-one, which can be obtained in a pure form melting at 192° C. in a yield of 0.3 part by known methods, such as chromatography or recrystallization from dilute alcohol or isopropyl ether. The pregnenolone can be converted in the usual manner into progesterone.

Example 9

1000 parts of pure carbon tetrachloride are poured on to 100 parts of $\Delta^{23}$-3$\alpha$:12$\beta$-diacetoxy-24:24-diphenyl-cholene and 30 parts of bromosuccinimide, and the carbon tetrachloride is slowly distilled under powerful illumination. After boiling for a short time the distillate gives an acid reaction to Congo, the solution is then cooled, and the succinimide is separated by filtering with suction. The filtrate is then mixed with 100 parts of dimethylaniline, the carbon tetrachloride is completely removed by distillation, and the concentrated solution is boiled for 10 minutes longer in a reflux apparatus. After being cooled, it is taken up in ether, and the ethereal solution is washed with hydrochloric acid and water, dried, and evaporated.

1000 parts of methanol are poured on to the residue, a solution of 30 parts of potassium carbonate in 50 parts of water is added, and the whole is heated for 3 hours in a reflux apparatus. The $\Delta^{20,23}$-3$\alpha$ - hydroxy - 12$\beta$-acetoxy-24:24 - diphenyl - choladiene, which already separates while the mixture is warm, is cooled and isolated by filtering with suction. It is then washed and dried. Further quantities thereof can be recovered from the mother liquor. The total yield amounts to 54.4 parts.

In order to regenerate the unused starting material the evaporated mother liquor is re-acetylated. After recrystallization from a mixture of acetone and water, 20 parts of $\Delta^{23}$-3$\alpha$:12$\beta$-diacetoxy - 24:24 - diphenyl - cholene are recovered, and by repeated hydrolysis of the mother liquors a further 5 parts of the monoacetate of the diene are obtained. The total yield amounts to 63.7 per cent. of the theoretical yield, or 79.8 per cent. when the starting material recovered is taken into account.

The diene monoacetate may be oxidized directly with chromic acid in the manner described in Example 5 to form 12-acetoxy-pregnane-3:20-dione.

Alternatively, in the manner described in Example 4, the diene monoacetate may first be acetylated and then oxidized with chromic acid, whereby, after partial hydrolysis, 3α-hydroxy-12β-acetoxy-pregnane-20-one is obtained in a yield of 21.8 parts, that is to say 34.6 per cent. of the theoretical yield or 43.4 per cent. when the starting material recovered is taken into account.

If the bromosuccinimide is allowed to react without the aid of illumination, there is obtained under the most favourable conditions (see Example 2) at most a yield of 22 per cent. of 3α-hydroxy-12β-acetoxy-pregnane-20-one, taking into account the starting material recovered.

*Example 10*

1000 parts of pure carbon tetrachloride are poured on to 100 parts of $\Delta^{23}$-3α:12β-diacetoxy-24:24-diphenyl-cholene and 30 parts of bromosuccinimide, and the whole is heated at the boil under powerful illumination in a reflux apparatus fitted with a calcium chloride seal. After boiling for a short time hydrogen bromide is evolved. The reaction mixture is heated for about 4 hours longer until the evolution of hydrogen bromide ceases. After cooling, the succinimide is separated by filtering with suction, the filtrate is evaporated, and the residue is dissolved in acetone. 75.4 parts of $\Delta^{20,23}$-3α:12β-diacetoxy-24:24-diphenyl-choladiene crystallize out. The dieine-diacetate obtained by recrystallization from acetone melts at 144–146° C., then resolidifies in the form of small needles, and finally melts again at 184° C. The evaporated mother liquors are boiled with 30 parts of dimethylaniline for 10 minutes, the cooled solution is then diluted with ether, and the dimethylaniline is removed by extraction with hydrochloric acid and water. The ethereal solution is then dried with sodium sulfate, and evaporated, and the residue is reacetylated with 50 parts of pyridine and 30 parts of acetic anhydride on the water bath for one hour. After evaporating the solution under reduced pressure the residual oil is taken up in ether, the ethereal solution is washed with hydrochloric acid and water, dried, and evaporated. By recrystallization from a mixture of acetone and a little water 6.4 parts of the diene-diacetate are obtained. The total yield amounts to 82 per cent. of the theoretical yield.

When it is desired to isolate the $\Delta^{23}$-3α:12β-diacetoxy-22-bromo-24:24-diphenyl-cholene primarily formed, the procedure may for example, be as follows:

5 parts of $\Delta^{23}$-3α:12β-diacetoxy-24:24-diphenyl-cholene are heated at the boil with 2.3 parts of bromosuccinimide in 70 parts of carbon tetrachloride under powerful illumination for 7 minutes. The solution is then cooled, and the resulting succinimide is separated by filtering with suction. The filtrate is evaporated at 20° C. under reduced pressure, and the residue is taken up in hexane. The resulting solution is filtered through a column charged with floridin, and then again evaporated at 20° C. under reduced pressure. The $\Delta^{23}$-3α:12β-diacetoxy-22-bromo-24:24-diphenyl-cholene of low stability so obtained remains behind in the form of an almost colorless powder. It melts at 85–90° C. with decomposition. In order to eliminate hydrogen bromide to form $\Delta^{20,23}$-3α:12β-diacetoxy-24:24-diphenyl-choladiene the product may be immediately boiled for about 4 hours in carbon tetrachloride or merely boiled for 10 minutes in dimethylaniline.

In order to bring about complete hydrolysis, 10 parts of the resulting diene-diacetate (melting at 144–146° C. and 184° C.) are heated in a reflux apparatus for 2 hours with 4 parts of potassium hydroxide in 250 parts of aqueous ethanol. The reaction solution is then evaporated under reduced pressure, and the residue is taken up in ether. The ethereal solution is washed with water, dried with sodium sulfate, treated with a small quantity of carbon, and then allowed to flow through a column charged with a small quantity of aluminium oxide. The residue which remains after evaporating the solution crystallizes from methanol in the form of fine needles containing water. The $\Delta^{20,23}$-3α:12β-dihydroxy-24:24-diphenyl-choladiene so obtained melts unsharply at 124° C.

The diene-diacetate may be oxidized with chromic acid as described in Example 4, whereby, after partial hydrolysis of the oxidation product, 3α-hydroxy-12β-acetoxy-pregnane-20-one is obtained in a yield amounting to 48 per cent. of the theoretical yield calculated on the $\Delta^{23}$-3α:12β-diacetoxy-24:24-diphenyl-cholene used as starting material.

The same final product is obtained when, for example, $\Delta^{23}$-3α:12β-diacetoxy-24:24-dimethyl-cholene is used as starting material. Furthermore, $\Delta^{23}$-3α-acetoxy-24:24-diphenyl-cholene (obtainable from lithocholic acid, i. e. 3α-hydroxy-cholanic acid) can be degraded in an analogous manner to form 3α-hydroxy-pregnane-20-one, which can be converted in a simple manner into progesterone. Higher homologues are also suitable as starting materials, for example, $\Delta^{5,24}$-3β-acetoxy-cholestadiene (obtainable from $\Delta^{5}$-3β-hydroxy-homo-cholenic acid or from $\Delta^{5}$-3β-acetoxy-cholestene-25-one, obtained by the oxidative degradation of cholesterin acetate, by reaction with methyl magnesium bromide followed by the elimination of water).

*Example 11*

100 parts of $\Delta^{23}$-3α:12β-diacetoxy-24:24-diphenyl-cholene in 1000 parts of carbon tetrachloride are caused to react with 40.2 parts of bromo-phthalimide of 94.5 per cent. strength in the manner described in Example 10, and converted as described therein into $\Delta^{20,23}$-3α:12β-diacetoxy-24:24-diphenyl-choladiene. In this manner there are obtained 69 parts of the latter diene-diacetate having the double melting point of 144–146° C. and 184° C.

The mother liquors are then boiled in aqueous methanol with 10 parts of potassium carbonate in a refluz apparatus for one hour, then the whole is evaporated under reduced pressure, the suspension which remains behind is dissolved in ether and chloroform, and the resulting solution is washed with water. After drying the ether-chloroform solution with sodium sulfate it is evaporated, and the residual oil is dissolved in ether. $\Delta^{20,23}$-3α-hydroxy-12β-acetoxy-24:24-diphenyl-choladiene slowly crystallizes (the yield being 11 parts). After being recrystallized once from benzene it is pure and melts at 232–234° C. The total yield of the diacetoxy-diene and monoacetoxy-diene amounts to 81 per cent. of the theoretical yield.

The diene-monoacetate may be oxidized directly with chromium trioxide as described in Example 5 to form 12-acetoxy-pregnane-3:20-dione. Alternatively it may first be acetylated and then oxidized with chromium trioxide, as described in Example 4 of the aforesaid specification, whereby 3α-hydroxy-12β-acetoxy-pregnane-20-one is obtained after partial hydrolysis.

Example 12

20 parts of Δ²³-3-acetoxy-5-chloro-24:24-diphenyl-cholene in 450 parts of carbon tetrachloride are heated at the boil for 10-15 minutes with 6.2 parts of bromosuccinimide with exposure to light. After cooling, the succinimide is separated by filtering with suction, the clear filtrate is mixed with 20 parts of glacial acetic acid, boiled for 4 hours, and then concentrated by evaporation under reduced pressure. The resinous residue is recrystallized from isopropyl ether, whereby 13.6 parts of pure Δ²⁰,²³-3-acetoxy-5-chloro-24:24-diphenyl-choladiene melting at 196-199° C. are obtained. From the evaporated mother liquors 2.8 parts of unchanged starting material can be recovered as well as a fraction, which does not crystallize, and which, after treatment with dimethylaniline and hydrolysis as described in Example 6, can be worked up into progesterone.

6 parts of the acetoxy-chloro-diene melting at 196-199° C. are oxidized in 75 parts of chloroform and 60 parts of glacial acetic acid with 4.5 parts of chromium trioxide in 3 parts of water and 27 parts of glacial acetic acid at 0° C., while stirring, for 2-3 hours to form 3-acetoxy-5-chloro-pregnane-20-one, which latter may be converted into pregnenolone acetate by treatment with dimethylaniline at 200° C., or directly into pregnenolone by means of strong alkali.

By causing dimethylaniline to act at 200° C. on Δ²⁰,²³-3-acetoxy-5-chloro-24:24-diphenyl-choladiene there is obtained Δ⁵,²⁰,²³-3-acetoxy-24:24-diphenyl-cholatriene, which can be further worked up by, among other methods, the method described in Example 8.

Example 13

10 parts of Δ²³-3-acetoxy-5-chloro-24:24-diphenyl-cholene and 3.94 parts of bromo-phthalimide are heated at the boil in 150 parts of carbon tetrachloride while exposed to the illumination of a powerful incandescent bulb. In a short time the evolution of hydrogen bromide sets in. The solution is cooled, the phthalimide so obtained is separated by filtering with suction, and the filtrate is heated for a further 4 hours in a reflux apparatus in order to complete the elimination of hydrogen bromide. After evaporation and drying under reduced pressure, the resulting Δ²⁰,²³-3-acetoxy-5-chloro-24:24-diphenyl-choladiene is worked up in a manner similar to that described in Example 12.

Example 14

In a manner analogous to that described in Example 10 the following steroids, for example, are degraded:

(a) Δ²³-3β-acetoxy-24:24-diphenyl-allocholene melting at 175-178° C. (obtained, for example, from 3β-hydroxy-allocholanic acid methyl ester by reaction with phenyl magnesium bromide, followed by the elimination of water from the resulting tertiary alcohol and acetylation) with the formation of: Δ²⁰,²³-3β-acetoxy-24:24-diphenyl-allocholadiene melting at 153-156° C., Δ²⁰,²³-3β-hydroxy-24:24-diphenyl-allocholadiene melting at 92-94° C., 3β-acetoxy-allopregnane-20-one melting at 150-152° C., and 3β-hydroxy-allopregnane-20-one melting at 195-198° C. in a yield amounting to 60.6 per cent. of the theoretical yield.

(b) Δ²³-3α:7α:12β-triacetoxy-24:24-diphenyl-cholene with the formation of: Δ²⁰,²³-3α:7α:12β-triacetoxy-24:24-diphenyl-choladiene melting at 106-116° C., Δ²⁰,²³-3α:7α:12β-trihydroxy-24:24-diphenyl-choladiene melting at 134-138° C., 3α:7α:12β-trihydroxy-pregnane-20-one melting at 120-127° C., 3α:7α:12β-triacetoxy-pregnane-20-one melting at 134-135° C. (containing water of crystallization when crystallized from ether-pentane) or at 156-161° C. (anhydrous when crystallized from hexane) and 3α:7α-dihydroxy-12β-acetoxy-pregnane-20-one melting at 230-234° C. in a yield of 40.9 per cent. of the theoretical yield.

(c) Δ²³-24:24-diphenyl-allocholene melting at 171-177° C. (obtained, for example, from allocholanic acid methyl ester by reaction with phenyl magnesium bromide and eliminating water from the resulting tertiary carbinol) with the formation of: Δ²⁰,²³-24:24-diphenyl-choladiene melting at 160-162° C. and allopregnane-20-one melting at 136-139° C. in a yield of 44.4 per cent. of the theoretical yield.

What is claimed is:

1. In a process for the degradation of the side-chain of a 10:13-dimethyl-cyclopentanopolyhydrophenanthrene, the steps of causing a 10:13-dimethyl - cyclopentanopolyhydrophenanthrene carrying in 17-position a substituent of the formula

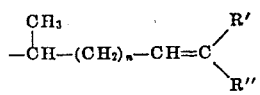

wherein R' and R'' each represent a member selected from the group consisting of hydrogen and lower aliphatic and lower aromatic hydrocarbon radicals, and $n$ is one of the integers 1 and 2, to react with a member of the group consisting of a carboxylic acid imide, amide and arylamide halogenated at the nitrogen while exposing the reactants to strong light.

2. A process according to claim 1, wherein hydrogen halide is eliminated from the product of the reaction by means of a dehydrohalogenating agent.

3. A process according to claim 1, wherein hydrogen halide is eliminated from the product of the reaction by simple heating.

4. In a process for the degradation of the side-chain of a 10:13-dimethyl-cyclopentanopolyhydrophenanthrene, the steps of causing a 10:13-dimethyl - cyclopentanopolyhydrophenanthrene carrying in 17-position a substituent of the formula

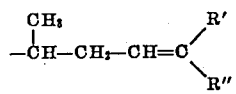

wherein R' and R'' each represent a member of the group consisting of hydrogen and lower aliphatic and lower aromatic hydrocarbon radicals, to react with N-bromo-succinimide while exposing the reactants to strong light, and eliminating hydrogen halide from the product of the reaction by means of simple heating.

5. A process for the degradation of the side chain of a Δ²³-3-acetoxy-5-chloro-24:24-diphenyl-cholene which comprises causing the Δ²³-3-acetoxy-5-chloro-24:24-diphenyl-cholene to react with N-bromo-succinimide while exposing the reactants to strong light, eliminating hydrogen bromide and hydrogen chloride from the product thus obtained and subsequently splitting up the newly formed conjugated double bond by means of chromium oxide.

6. A process for the degradation of the side chain of $\Delta^{23}$-3-acetoxy-5-chloro-24:24-diphenyl-cholene which comprises causing the $\Delta^{23}$-3-acetoxy-5-chloro-24:24-diphenyl-cholene to react with N-bromo-succinimide while exposing the reactants to strong light, eliminating hydrogen bromide and hydrogen chloride from the product thus obtained and subsequently splitting up the newly formed conjugated double bond by means of chromium oxide, wherein the splitting up of the double bond is effected with the additional steps of converting the 3-acetoxy group into a free hydroxyl group by means of a hydrolyzing agent and subsequently into a keto group by the action of an oxidizing agent.

7. A process according to claim 6, wherein the splitting up of the double bond is effected after carrying out the steps of converting the 3-acetoxy group into a free hydroxyl group by means of a hydrolyzing agent and subsequently into a keto group by the action of an oxidizing agent.

KARL MIESCHER.
HUGO FREY.
CHARLES MEYSTRE.
ALBERT WETTSTEIN.

REFERENCES CITED

The following references are of record in the file of this patent:

FOREIGN PATENTS

| Number | Country | Date |
|---|---|---|
| 544,051 | Great Britain | Mar. 25, 1942 |

OTHER REFERENCES

Zeigler, Annalen 551, pages 80–119 (1942). (Copy in the Scientific Library.)

Meystre et al., Helv. Chim. Acta 27, 1815–1824 (1944).

Certificate of Correction

Patent No. 2,461,910. February 15, 1949.

KARL MIESCHER ET AL.

It is hereby certified that errors appear in the printed specification of the above numbered patent requiring correction as follows:

Column 4, line 16, for "perbonzoic" read *perbenzoic*; column 7, line 14, for "crystalize" read *crystallize*; column 8, line 35, for "keto-tiene" read *keto-triene*; line 51, for "benzine" read *benzene*; column 10, line 62, for "etheral" read *ethereal*; column 13, line 30, for "dieine-diacetate" read *diene-diacetate*; column 14, line 56, for "refluz" read *reflux*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*